(12) United States Patent
Suzuki et al.

(10) Patent No.: US 8,315,726 B2
(45) Date of Patent: *Nov. 20, 2012

(54) MUSIC GENRE JUDGING DEVICE AND GAME MACHINE HAVING THE SAME

(75) Inventors: Matsumi Suzuki, Tokyo (JP); Yasushi Yoshida, Tokyo (JP); Hajime Suzuki, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1142 days.

This patent is subject to a terminal disclaimer.

(21) Appl. No.: 12/096,248

(22) PCT Filed: Dec. 8, 2006

(86) PCT No.: PCT/JP2006/324529
§ 371 (c)(1),
(2), (4) Date: Jun. 5, 2008

(87) PCT Pub. No.: WO2007/066754
PCT Pub. Date: Jun. 14, 2007

(65) Prior Publication Data
US 2010/0216554 A1    Aug. 26, 2010

(30) Foreign Application Priority Data
Dec. 9, 2005    (JP) .................................. 2005-365454

(51) Int. Cl.
*G06F 17/00*    (2006.01)
(52) U.S. Cl. ................. 700/94; 700/90; 381/58; 463/35
(58) Field of Classification Search ..................... 700/94
See application file for complete search history.

(56) References Cited

U.S. PATENT DOCUMENTS
7,031,243 B2 *    4/2006    Yamada et al. ............ 369/53.31
(Continued)

FOREIGN PATENT DOCUMENTS
JP    57-27298    2/1982
(Continued)

OTHER PUBLICATIONS

Goto_FO: real time music scene description system: Copyright 2004.*

*Primary Examiner* — Paul McCord
(74) *Attorney, Agent, or Firm* — Edwards Wildman Palmer LLP; Peter C. Schechter; Brian R. Landry

(57) ABSTRACT

Provided is a music genre judging device capable of judging a genre of music with a comparatively simple configuration. The music genre judging device comprises: a signal processing unit 10 for outputting integration value and differential value for each of low-frequency component and high-frequency component of music reproduction signal inputted from a music reproduction device 100 to a line input terminal 4; a data generation unit 30 for inputting the integration value and the differential value outputted from the signal processing value by each predetermined sampling unit time, judging whether or not each of the integration value and the differential value exceeds a predetermined level within the sapling unit time, and generating analysis data obtained by totalizing for each sampling cycle, the number of times of judgments that the value exceeding the predetermined level is detected; and a data analysis unit 31 for judging a genre of music outputted from the music reproduction n device 100 based on the totalized value of the analysis data.

19 Claims, 7 Drawing Sheets

U.S. PATENT DOCUMENTS

| | | | |
|---|---|---|---|
| 2002/0053275 A1* | 5/2002 | Ogawa et al. | 84/662 |
| 2003/0205124 A1* | 11/2003 | Foote et al. | 84/608 |
| 2005/0241465 A1* | 11/2005 | Goto | 84/616 |

FOREIGN PATENT DOCUMENTS

| | | |
|---|---|---|
| JP | 10-031494 | 2/1998 |
| JP | 11-231880 | 8/1999 |
| JP | 2001-029649 | 2/2001 |
| JP | 2001-308979 | 11/2001 |
| JP | 2002-140076 | 5/2002 |
| JP | 2002-341888 | 11/2002 |
| JP | 2003-302988 | 10/2003 |

* cited by examiner

FIG. 4
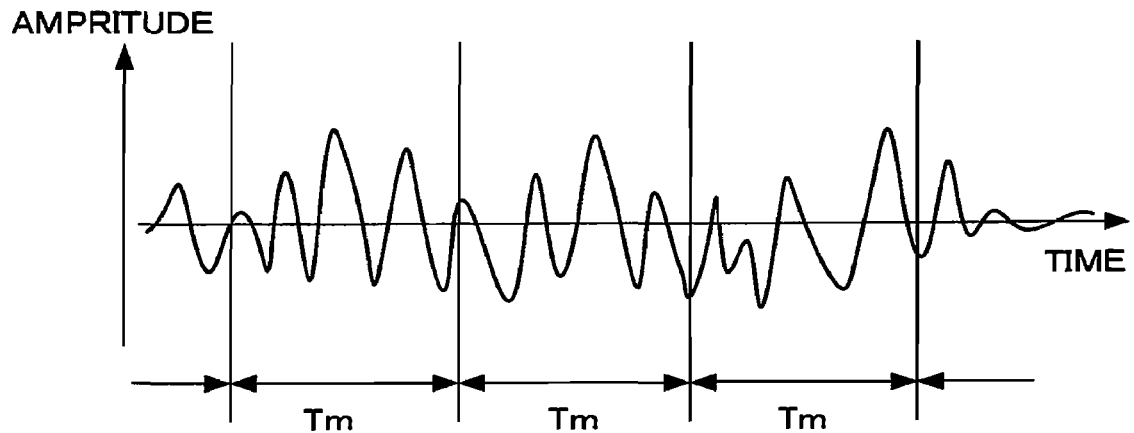
FIG. 5
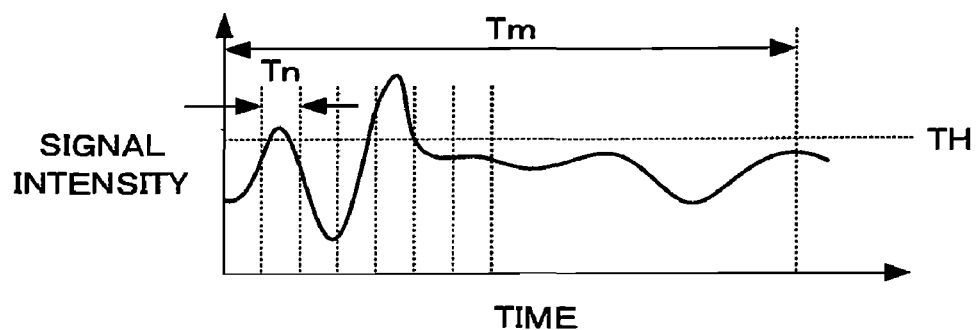
FIG. 6
D1
|  | ch0 | ch1 | ch2 | ch3 |
|---|---|---|---|---|
| smp1 | sum01 | sum11 | sum21 | sum31 |
| smp2 | sum02 | sum12 | sum22 | sum32 |
| smp3 | sum03 | sum13 | sum23 | sum33 |
| smp4 | sum04 | sum14 | sum24 | sum34 |
| ⋮ | ⋮ | ⋮ | ⋮ | ⋮ |
| smpN | sum0N | sum1N | sum2N | sum3N |
| STANDARD DEVIATION | SD0 | SD1 | SD2 | SD3 |

| GENRE A | a0 | a1 | a2 | a3 |
|---|---|---|---|---|
| GENRE B | b0 | b1 | b2 | b3 |
| GENRE C | c0 | c1 | c2 | c3 |
| ⋮ | | | | |
| GENRE X | x0 | x1 | x2 | x3 |

| GENRE A | Na |
|---|---|
| GENRE B | Nb |
| GENRE C | Nc |
| ⋮ | |
| GENRE X | Nx |

MUSIC GENRE JUDGING DEVICE AND GAME MACHINE HAVING THE SAME

CROSS-REFERENCE TO PRIOR APPLICATIONS

This is a U.S. national phase application under 35 U.S.C. §371 of International Patent Application No. PCT/JP2006/324529, filed Dec. 8, 2006, and claims the benefit of Japanese Application No. 2005-356454, filed Dec. 9, 2005, both of which are incorporated by reference herein. The International Application was published in Japanese on Jun. 14, 2007 as International Publication No. WO 2007/066754 A1 under PCT Article 21(2).

TECHNICAL FIELD

The present invention relates to an apparatus and the like which music reproduction signal of music reproduced by a music reproduction device is inputted into and judges a genre of the music.

BACKGROUND ART

The music reproduction signal outputted from a line output terminal of a music reproduction device like a mobile-type of audio player is analog signal generated on condition that audio conversion by audio output device such as a head phone. Information for judging a music genre is not added to the music reproduction signal.

As means for analyzing such music reproduction signal to judge a genre of music, a high-level frequency analyzing processing such as FFT is conventionally used. Not provided so far is a music genre judging device possible to be combined with a music reproduction device and be used by general users. Additionally, in a field of game machine, a system is provided, where audio signal inputted from a microphone is analyzed and the result of analysis is reflected to a figure of character (for example, please refer to the below patent document 1.). Patent document 1: Unexamined Patent Publication No. 2001-29649

DISCLOSURE OF THE INVENTION

Problems to be Solved by the Invention

Therefore, it is the aim of the present invention to provide a music genre judging device and a game machine applied to the same capable of judging a genre of music with a comparatively simple configuration.

Means for Solving the Problems

The music genre judging device of the present invention solves the above problem by comprising: a signal input portion for inputting music reproduction signal outputted from a music reproduction device; a signal processing unit for outputting an integration value and a differential value of each of low-frequency component and high-frequency component of the music reproduction signal inputted by the signal input portion; a data generation unit for inputting each of the integration value and the differential value outputted from the signal processing unit by each predetermined sampling unit time, judging whether each of the integration value and the differential value exceeds a predetermined level within the sampling unit time, and generating analysis data obtained by totalizing number of times when it is judged the value exceeds the predetermined value is detected by each predetermined sampling cycle for the integration value and the differential value individually; and a data analysis unit for judging a genre of music outputted form the music reproduction device based on totalized values described in the analysis data.

According to the inspection of the inventors of the present invention, in the music reproduction signal outputted to the audio output device, a common or similar character depending on a genre of music is included, and the character is correlated to a distribution condition of integration values and differential values of each of a low-frequency component and a high-frequency component included in the music reproduction signal. With respect to the music genre judging device of the present invention, the integration value and the differential value outputted from the signal processing unit are inputted into the data generation unit by each sampling unit time, it is judged whether each of the integration value and the differential value exceeds a predetermined level within the sampling unit time, and the analysis data, obtained by totalizing the number of times of judgment that the value exceeds the predetermined level for each a predetermined sampling cycle and for an integration value and a differential value individually, is generated by the data generation unit. The obtained totalized value reflects the distribution of the integration values and the differential values in each sampling cycle for each of the low-frequency component and the high-frequency component included in the music reproduction signal. Accordingly, by investigating the character depending on the genre of music based on the totalized values, the genre of music to be reproduced with the music reproduction signal can be judged. The processing for integration and differentiation to music reproduction signal can be executed comparatively easily. Moreover, with respect to the processing to the integration values and the differential values, the processing such as only judging whether the integration value and the differential value exceed the predetermined level for each sampling unit time, and only totalizing the result of judgment, can be also executed comparatively easily and quickly. Therefore, by the music genre judging device of the present invention, it can be applied well to even a general consumable product having a small micro processing unit which performs limited ability.

In one embodiment of the music genre judging device of the present invention, the data analysis unit may calculate standard deviations of the totalized values respectively to judge the genre of music based on a ratio between the standard deviations. By using the ratio of standard deviations, the character of the genre of music can be extracted more clearly to judge the genre with a high accuracy.

In one embodiment of calculating the standard deviations, the music genre judging device may further comprise judgment reference data where each ratio of standard deviations is corresponded to each genre of music, and the data analysis unit may judge a genre corresponded to a ratio closest to the ratio of the calculated standard deviations as a genre of music to be reproduced with the music reproduction signal inputted from the signal input portion. According to this embodiment, a correlation between a genre of music and the ratio of standard deviations of the integration values and the differential values for each of low-frequency component and high-frequency component is investigated in advance to describe the judgment reference data. Thereby, it makes it easy to determine which character of genre the ratio of the standard deviations is indicating, the ratio obtained by analyzing the music reproduction signal inputted from the signal input portion.

In one embodiment of the music genre judging device of the present invention, the music genre judging device may further comprise history data where the genre of music and the number of times when the genre is judged by the data analysis unit are corresponded to each other, and the data analysis unit may update the history data depending on a judgment result of the genre of music. According to this embodiment, by recording for each genre, the number of times of judgments by the music genre judging device, it is possible to analyze a tendency of user, such as which genre of music is reproduced many times by the music reproduction device. Moreover, by using the history data, it is possible to provide various processing, operations, serves and the like appropriate to the user's preference.

It is possible to use the music genre judging device of the present invention in various embodiments. One example of them, the music genre judging device may be arranged between a line output terminal of the music reproduction device and an audio output device for audio-converting the music reproduction signal outputted from the line output terminal, and may comprise: a bypass route for passing the music reproduction signal outputted form the line output terminal to the audio output device; and a route for inputting the music reproduction signal into the signal processing unit. According to this embodiment, while playing music by getting the music reproduction signal outputted from the line output terminal of a specified music reproduction device to the audio output device, it is possible to judge a genre of the music.

The present invention may be configured as a game machine comprising the above mentioned music genre judging device and a game control unit for reflecting a judgment result of the genre of music to game contents. By such as the game machine, the music reproduction signal outputted from the music reproduction device is inputted, and the genre of music to be reproduced with the music reproduction signal can be made to reflect to a game. Therefore, it is possible to provide a new style tool which combines music reproduction by a music reproduction device and a game.

Additionally, in the above explanation, though reference numbers of attached drawings with parentheses are added to help you to comprehend the present invention, which does not mean that the present invention is limited to the embodiment in the drawings.

Effects of Invention

As mentioned above, according to the present invention, by obtaining the totalized values indicating distribution conditions of the integration values and the differential values for each of low-frequency component and high-frequency component of the music reproduction signal, and judging the music genre based on the totalized values, it is possible to realize a music genre judging device and a game machine applied to the same capable of judging a genre of music with a comparatively simple configuration.

BRIEF DESCRIPTION OF DRAWINGS

FIG. 4: a diagram showing a relation between music reproduction signal and a sampling cycle.

FIG. 5: a diagram showing a relation between wave forms of integration values and a sampling unit time within the sampling cycle.

FIG. 6: a diagram showing the contents of analysis data.

FIG. 7: a diagram showing the contents of judgment reference data.

FIG. 8: a diagram showing the contents of history data.

BEST MODE FOR CARRYING OUT THE INVENTION

Figure 1:
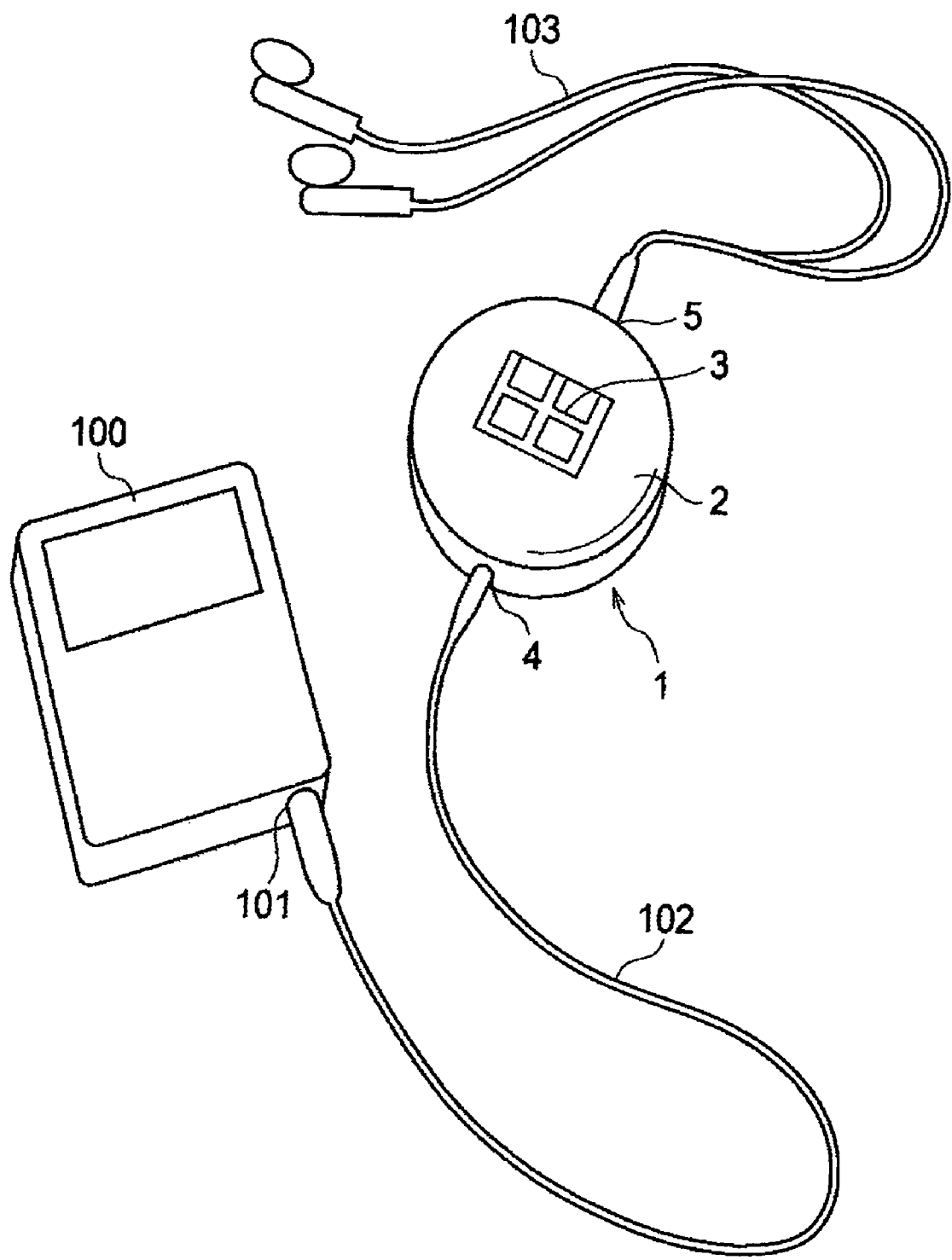
FIG. 1: a diagram showing a situation that a mobile-type game machine where a music genre judging device according to one embodiment of the present invention is mounted is arranged between a mobile-type music player and earphones.

FIG. 1 shows a mobile-type game machine into which a music genre judging device according to one embodiment of the present invention is mounted. The game machine 1 is used in combination with a mobile-type music player 100. The game machine 1 comprises a housing 2 and an LCD 3 as a display device mounted in front of the housing 2. A line input terminal 4 and a phone terminal 5 are mounted to the housing 2. The line input terminal 4 is connected with a line output terminal 101 of the mobile-type music player 100 via a junction cable 102. The phone terminal 5 is connected with earphones 103. That is, the game machine 1 of the present invention is arranged between the mobile-type music player 100 and the audio output device to be combined with the mobile-type music player 100. The audio output device to be combined with the music player 100 is not limited to be the earphones 103. Namely, the mobile-type music player 100 may be a device capable of outputting music reproduction signal for audio conversion to various audio output devices such as speakers and headphones, and details such as a format of recording medium and a reproduction method are not limited. Moreover, the music player is not limited to a mobile-type one, and may be any one capable of outputting music at an audio system for home use, a television, or a commercially available mobile electronic game.

Figure 2:
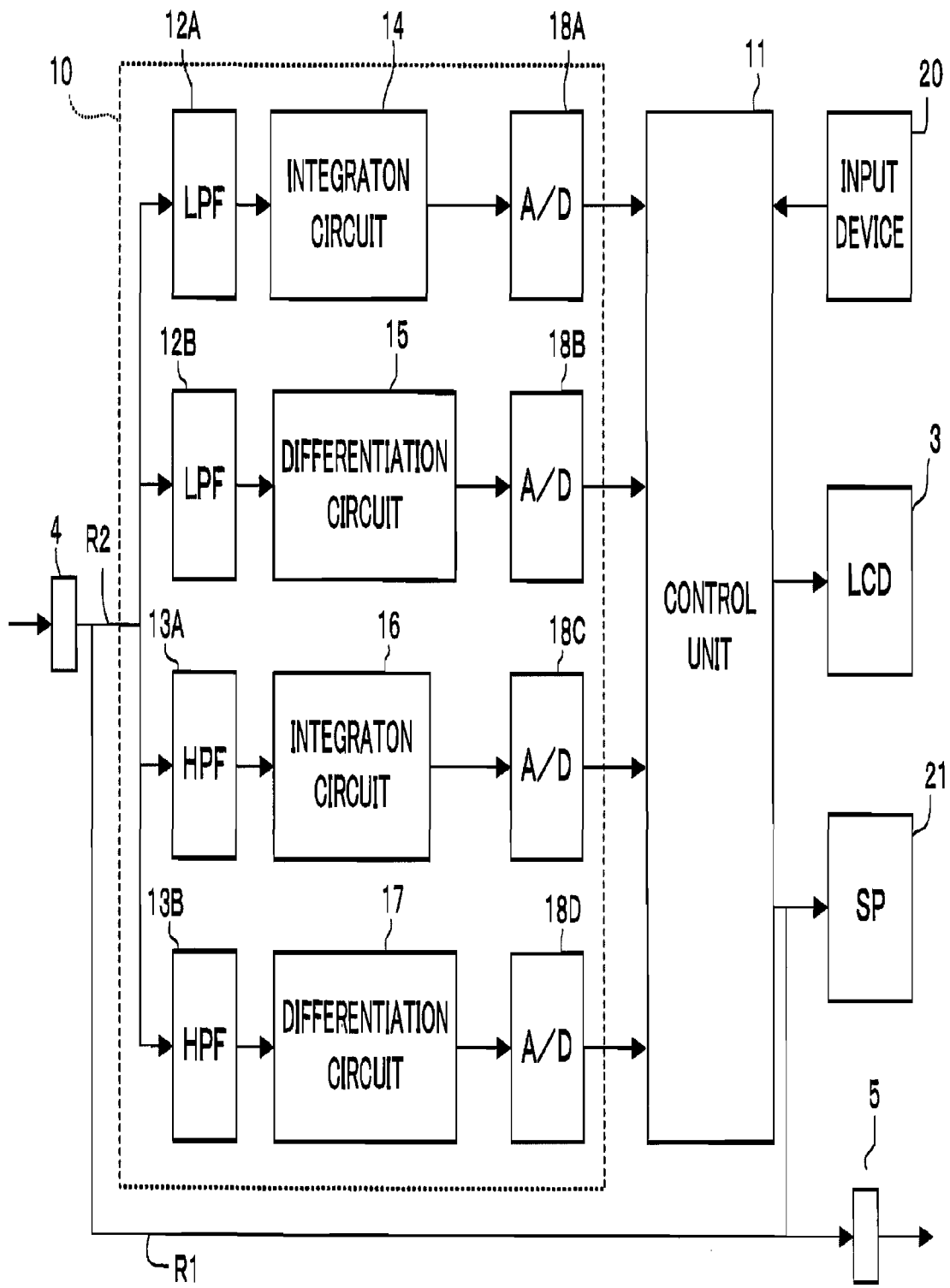
FIG. 2: a block diagram about a portion relating to judge a music genre in a control system of the game machine shown in FIG. 1.

The game machine 1 functions as a repeater to get the music reproduction signal outputted from the line input terminal 4 of the music player 100 to the earphones 103, and also functions as a game machine to analyze the music reproduction signal outputted from the music player 100 and provide to a user, a game depending on the analysis result. FIG. 2 is a block diagram showing a construction of a portion especially relating to a function to get and analyze the music reproduction signal in a control system mounted in the game machine 1. The game machine 1 has a bypass route R1, a signal processing unit 10, and a control unit 11. The bypass route R1 gets analog audio reproduction signal from the line input terminal 4 to the phone terminal 5 as a signal input portion. The signal processing unit 10 processes the audio reproduction signal inputted from the line input terminal 4 via a diverging route R2. The control unit 11 gets into output signal from the signal processing unit 10. Although each of the routes R1, R2 is constructed by tree lines of a right channel, a left channel and an earth channel, each of them is represented as one line in the diagram.

The signal processing unit 10 comprises a pair of low pass filter (LPF) 12A, 12B, a pair of high pass filter (HPF) 13A, 13B, an integration circuit 14 for integrating output signal of the LPF 12A, a differentiation circuit 15 for differentiating output signal of the LPF 12B, an integration circuit 16 for integrating output signal of the HPF 13A, a differentiation circuit 17 for differentiating output signal of the HPF 13B, and A/D converters 18A-18D for converting the output signals of the circuits 14 to 17 into digital signal and outputting the converted signals to the control unit 11. The pair of LPF 12A, 12B gets only the low-frequency component of the music reproduction signal inputted from the line input terminal 4 passed. The pair of HPF 13A, 13B gets only the high-frequency components of the music reproduction signal inputted from the line input terminal 4 passed. The frequency zone which the LPF 12A, 12B gets passed is set, for example, to equal or more than 1000 Hz, and the frequency zone which the HPF 13A, 13B gets passed is set, for example, to equal or less than 1000 Hz. Additionally, the set value of the frequency zone is not limited to the above set values. For example, the frequency zone which the LPF 12A, 12B gets passed can be set to equal or less than 500 Hz, and the frequency zone which the HPF 13A, 13B gets passed can be set to equal or more than 1000 Hz. Moreover, the frequency zones which the LPF 12A, 12B gets passed can be equal with each other or different from each other. In a case where the both of frequency zones to be got passed are equal to each other, a single LPF instead of LPF 12A and 12B can be mounted and the output signal from the single LPF can be diverged in the integration circuit 14 and the differentiation circuit 15. The frequency zones the LPF 12A, 12B gets passed can be equal to or different from each other. The same goes for the HPF 13A, 13*b*.

The control unit 11 is configured as a computer unit configured by combining a micro processing unit (MPU) and peripheral devices necessary for MPU's action for example, storage devices such as a RAM and a ROM. The control unit 11 is connected with the LCD3 as a control object, and also connected with an input device 20 for giving instructions in a game or the like and speaker unit (SP) 21 for outputting audio, effect sound and the like. Moreover, a route to connect with the speaker unit (SP) 21 is also connected with the phone terminal 5.

Figure 3:
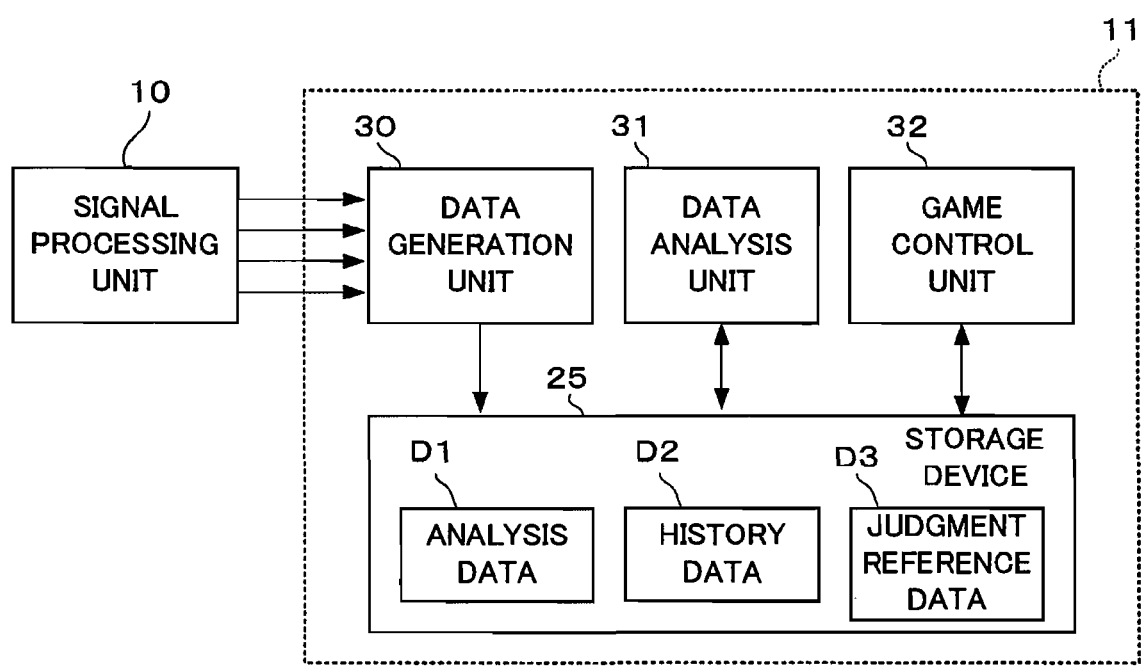
FIG. 3: a function block diagram about a control unit shown in FIG. 2.

The control unit 11 provides various game functions to a user by executing processing such as allowing a game image to display on LCD3. As a function added to the game, the control unit 11 also has a function for analyzing the output signal of the signal processing unit 10 to judge a genre of music. FIG. 3 is a function block diagram of the control unit 11. The MPU (not shown in the drawing) of the control unit 11 reads out from a storage device 25 and executes a predetermined control program. Because of that, a data generation unit 30, a data analysis unit 31, and a game control unit 32 are generated as logical devices in the control unit 11. The data generation unit 30 processes the output signal of the signal processing unit 10 to generate analysis data D1, and stores the analysis data D1 in the storage device 25. The data analysis unit 31 reads out the analysis data D1 to judge a genre of music by a predetermined method, and updates history data D2 depending on the judgment result. Judgment reference data D3 stored in the storage device 25 is referred for the genre judgment. The game control unit 32 executes a game in accordance with a predetermined game program (not shown in the drawing) while referring to the history data D2

Next, in reference to FIGS. 4 to 8, processing with respect to genre judgment by the game machine 1 will be described. FIG. 4 shows an example of wave form of music reproduction signal inputted into the signal processing unit 10 from the line input terminal 4. In the signal processing unit 10, the low-frequency component of music reproduction signal is obtained by LPF 12A, 12B, and the high-frequency component is obtained by HPF 13A, 13B. Integration value of the obtained low-frequency component is outputted from the integration circuit 14, differential value of the low-frequency component is outputted from the differentiation circuit 15, integration value of the high-frequency component is outputted from the integration circuit 16, and differential value of the high-frequency component is outputted from the differentiation circuit 17. The outputted integration values and differential values are converted to digital signal by the A/D converter 18A to 18D to be inputted into the data generation unit 30 in the control unit 11. In data generation unit 30, two kinds of time length are set, one is a sampling cycle Tm shown in FIG. 4 and another one is a sampling unit time Tn shown in FIG. 5 (showing an example of output waveform of the integration circuit 14), as criteria time for processing the integration values and the differential values outputted from the signal processing unit 10. The sampling cycle Tm is an integral multiple of the sampling unit time Tn. For example, the sampling cycle Tm is set to 5 seconds, and the sampling unit time Tn is set to 20 milliseconds.

The data generation unit 30 of the control unit 11 inputs the integration values and the differential values by each sampling unit time Tn, and judges whether the integration values and the differential values exceed a predetermined level within the sampling unit time Tn. Then, the data generation unit 30 totalizes the number of times of judgments that the value exceeds the predetermined value, by each sampling cycle Tm and for the integration value and the differential value individually, and generates the analysis data D1. For example, in the case where the integration value of the low-frequency component in one of the sampling cycles Tm in FIG. 4 moves as seen in FIG. 5, the data generation unit 30 monitors whether or not the integration value exceeds the predetermined border value TH within each sampling unit time Tn, and judges the integration value exceeds the predetermined level when the integration value exceeds the border value TH. However, regardless of the number of times of judgments that the integration value exceeds the border value TH within one sampling unit time Tn, if the integration value exceeding the border value TH is detected at least one time, the number of times is counted as 1. This judgment processing is repeated for each sampling unit time Tn within the sampling cycle Tm, the number of times of judgments that the value exceeds the predetermined level are totalized at the moment when the sampling cycle Tm elapses. In the case where the sampling cycle Tm is 5 seconds and the sampling unit time Tn is 20 milliseconds, in one cycle Tm, the minimum number of times is 0 and the maximum number of times is 250.

The data generation unit 30 of the control unit 11 executes the above mentioned processing independently for the integration value and the differential value each, totalizes the counted number of times sequentially for each sampling cycle Tm, and generates the analysis data D1 as seen in FIG. 6. With respect to the analysis data in FIG. 6, a channel ch0 corresponds to the output from the integration circuit 14, a channel ch1 corresponds to the output from the differentiation circuit 15, a channel ch2 corresponds to the output from the integration circuit 16, and a channel ch3 corresponds to the output from the differentiation circuit 17. Sample numbers smpl to smpN correspond to the numbers of cycle from the start moment of music reproduction signal respectively. In the present embodiment, it is assumed that the music reproduction signal corresponds to N cycles in total. Then, the totalized value sum0X of the channel ch0 with respect to the sample number smpX (X is a value of 1 to N) indicates the number of times of judgments that the integration value of the low-frequency component exceeds the predetermined level TH within the sampling cycle Tmx which is xth sampling cycle from the start moment of the processing. For example, sum01 corresponds to the number of times of judgments that the integration value exceeds the border value TH within the first sampling cycle. The same goes for the other channels ch1 to ch3.

The data analysis unit 31 calculates standard deviation SD0 to SD3 (cf. FIG. 6) of the totalized values described in the analysis data for each channel, that is, for each of the integration value and the differential value. Then, on the basis of a ratio (SD0:SD1:SD2:SD3) of the obtained standard deviations SD0 to SD3, the genre of music to be reproduced with the music reproduction signal is judged. For the genre judgment, the judgment reference data D3 is referred. As an example shown in FIG. 7, in the judgment reference data D3, the music genre A to x and the ratio of the standard deviations are associated with each other. In the present embodiment, a genre means a concept to be used for discriminating the contents of music such as classic, rock, ballad, and jazz. Comparing to the judgment reference data D3, the data analysis unit 31 judges the genre closest to the ratio of the obtained standard deviations SD0 to SD3 as a genre to be corresponded to the music reproduction signal. Moreover, after the judgment of the genre, the data analysis unit 31 updates the history data D2 depending on the judgment result. For example, as seen in FIG. 8, the history data D2 is described such that the genres A to X and the number of input times Na to Nx respectively associated with each other. The data analysis unit 31 updates the history data D2 by adding 1 to the number of times of judged genre.

Figure 9:
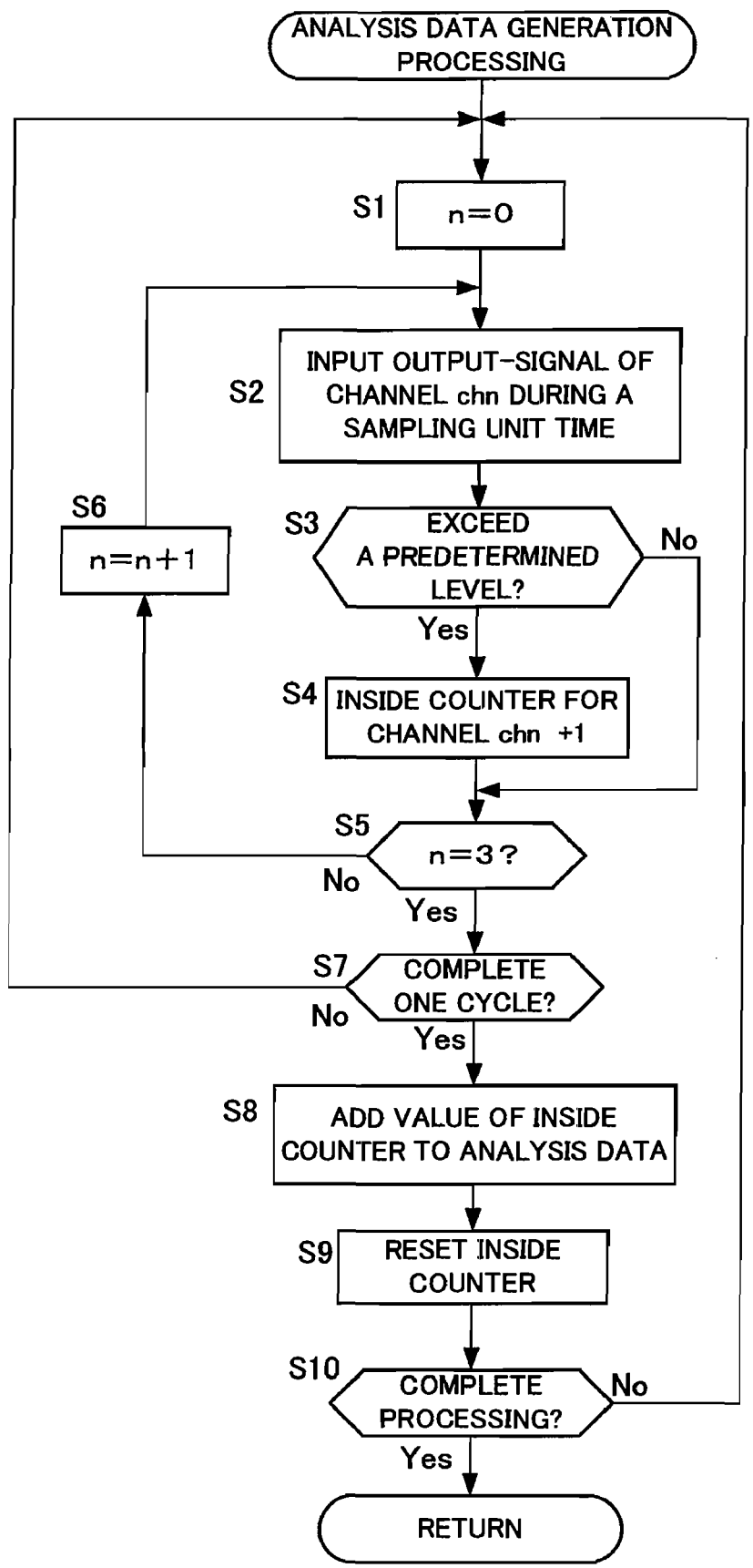
FIG. 9: a flowchart showing an analysis-data generation processing routine executed by the control unit.

Next, in reference to FIGS. 9 and 10, the procedures executed by the control unit 11 for realizing the genre judgment will be described. FIG. 9 shows an analysis data generation processing routine executed by the control unit 11 (the data generation unit 30) for generating the analysis data. This routine is executed under the condition that both of the integration value and the differential value are outputted from the signal processing unit 10 in a situation that a user instructs the genre judgment through the input device 20 (cf. FIG. 2). The integration value and the differential value outputted from the signal processing unit 10 are stored sequentially in an internal buffer of the control unit 11 and processed by this routine.

In the analysis data generation processing routine, in the first step S1, the control unit 11 sets the variable n to an initial value 0, the valuable n specifying the number of channel to be an object of data processing. In step S2, the output signal (the integration value and the differential value) of channel chn for the sampling unit time is inputted, and in the next step S3, the control unit 11 judges whether the inputted output-signal exceeds the predetermined level. In the case of exceeding the predetermined level, the control unit 11 goes to step S4 to add 1 to an inside counter for the channel chn. After that, the control unit goes to step S5. On the other hand, in step S3, in the case of not exceeding the predetermined level, the control unit 11 skips the step S4 and goes to step S5.

In step S5, the control unit 11 judges whether the variable n is set to 3, when the variable n is not 3, the control unit 11 adds 1 to the variable n in step S6 and returns to step S2. On the other hand, when the variable n is 3 in step S5, the control unit 11 goes to the step S7. By repeating the processing steps S2 to S6, the four channels ch0 to ch3, that is, the outputs of the integration circuit 14 and the differentiation circuit 15 for the low-frequency component and the integration circuit 16 and the differentiation circuit 17 for the high-frequency component are checked up during the length of the sampling unit time.

In step S7 the control unit 11 judges whether the processing for the sampling cycle Tm is completed. For example, in step S5, in the case where the number of times of affirmative judgments is equal to the value obtained by dividing the sampling cycle Tm by the sampling unit time Tn, it can be judged that the processing for sampling cycle Tm is completed. In the case where a negative judgment is done in step S7, the control unit 11 returns to step S1 for the processing of signal of the next sampling unit time, the signal being stored in the inside buffer. On the other hand, in the case where an affirmative judgment is done in step S7, the control unit 11 goes to step S8 to add the values stored in the inside counter to the analysis data D1 stored in the storage device 25 as the totalized values sum0X, sum1X, sum2X, sum3X (cf. FIG. 6) of the sample number smpX corresponding to this sampling cycle. If the analysis data D1 does not yet exist, the analysis data D1 is generated newly and the totalized value is stored in association with the first sample number smpl.

Subsequently, in step S9, the control unit 11 resets the value of inside counter to the initial value 0, and moreover, in next step 10, judges whether the analysis data generation processing is completed or not. For example, in the case where so-called no sound situation that the outputs of all channels Ch0 to ch3 are almost 0, continues for more than predetermined seconds, it can be judged that the processing is completed. Then, if the processing is not completed, the control unit 11 returns to the step S1. When it is judged that the processing is completed, the control unit 11 completes the analysis-data generation processing routine. By the above processing, the analysis data shown in FIG. 6 is generated.

Figure 10:
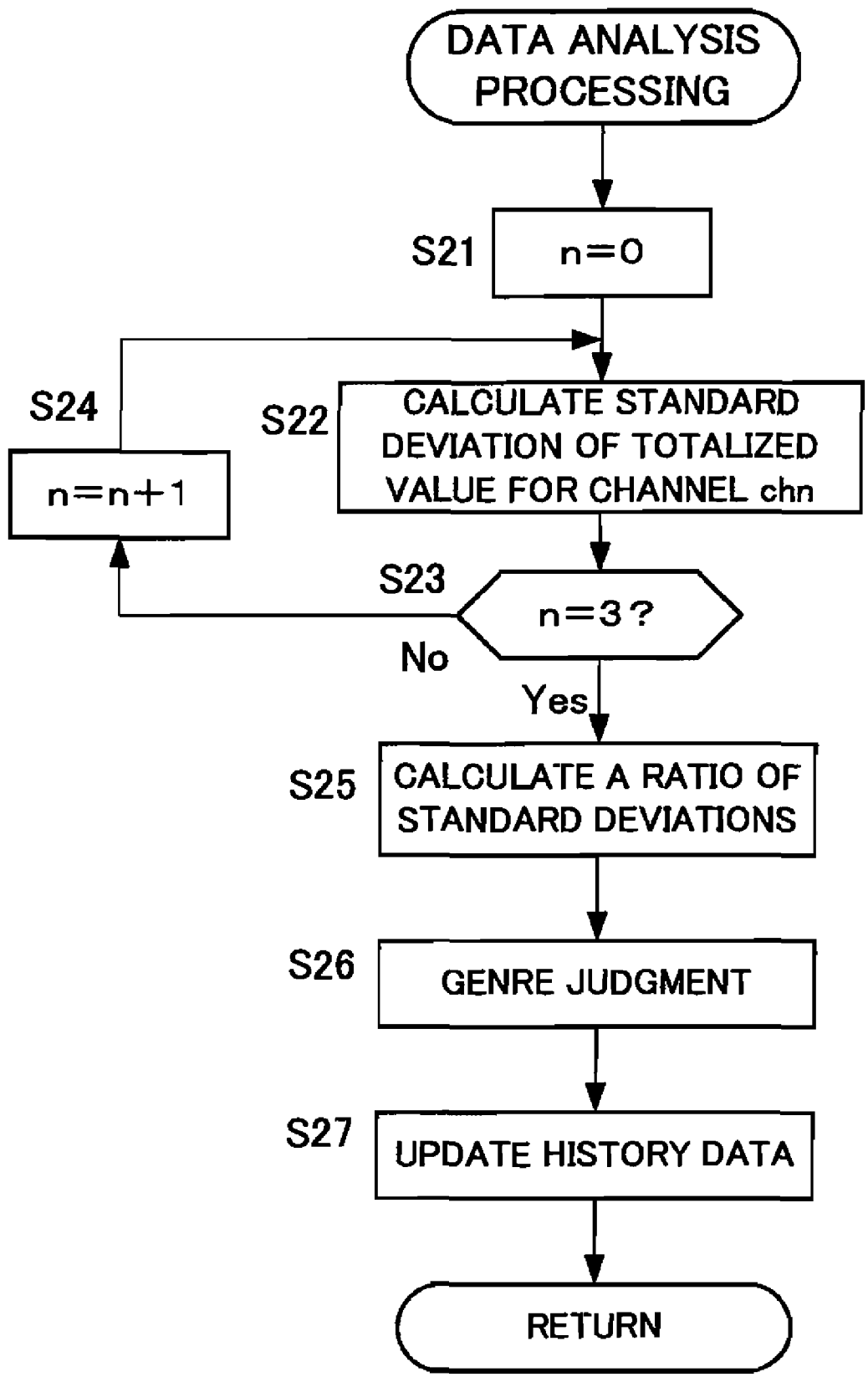
FIG. 10: a flowchart showing a data analysis processing routine executed by the control unit.

FIG. 10 shows a data analysis processing routine executed by the control unit 11 (data analysis unit 31) for judging a music genre from the analysis data. This routine is executed subsequently after the analysis data generation processing routine shown in FIG. 9 is completed. In the data analysis processing routine, the control unit 11 sets to the initial value 0, the variable n specifying the number of channel ch to be the object of data processing. Subsequently step S22, the control unit 11 reads out the totalized value of the cannel number chn corresponding to the variable n from the analysis data D1 stored in the storage device 25 and calculates the standard deviation of the totalized values. In the next step S23, the control unit 11 judges whether the variable n is set to 3. If not 3, the control unit 11 adds 1 to the variable n in step S24 and returns to step S22. On the other hand, if the variable is 3 in step S23, the control unit 11 goes to step S25. By repeating the processing of steps S22 to S24, the standard deviations SD0 to SD3 (cf. FIG. 6) of four cannels ch0 to ch3 are respectively calculated.

In step S25, the control unit 11 calculates the ratio of the standard deviations SD0 to SD3 between each other. In the next step S26, the control unit 11 compares the judgment reference data D3 in the storage device 25 to the obtained ratio of the standard deviations SD0 to SD3 and judges a genre of music by selecting the genre having the ratio closest to the ratio of the standard deviations SD0 to SD3. Additionally, in the next step S27, the control unit 11 updates the history data D2 such that 1 is added to the number of times corresponding to the judged genre, after that, the control unit 11 completes the data analysis processing routine.

In the game machine 1 of the present invention, as the number of times of judgments for each genre is stored in the history data D2, by referring to the history data D2, it is possible to analyze via the game machine 1, a repetition for each genre of music listened to by a user, user's favorite genre and the like, and reflect the judgment result of genre to the contents of game executed by the game control unit 32. For example, in the case where the game control unit 32 executes a game for growing up a character, it is possible that the game control unit 32 realizes operations that the character's attributes such as a figure, a personality and the like are changed depending on the distribution of number of times of judgments for each genre described in the history data D2.

The present invention is not limited to the above embodiment, and can be realized in various embodiments. For example, the signal processing unit is not limited to a device of having a pair of integration circuit and differentiation circuit for each low-frequency component and high-frequency component, but also could be a device of having not less than two integration circuits and differentiation circuits for low-frequency component, the frequency zone capable of going through each circuit could be different from each other. The same goes for high-frequency component. The signal processing unit could be configured as a hardware device where circuit elements such as IC, LSI and the like are combined with each other, or could be configured as a logical device where MPU are combined with soft wares. With respect to the data generation unit and data analysis unit each could be configured as a hardware device. The signal input portion is not limited to the line input terminal. For example, a device of receiving and converting to the music reproduction signal, the reproduction signal transmitted from the music reproduction device by using a wireless communication such as FM radio wave could be employed as the signal input portion.

In the above embodiment, the number of times when the integration value and the differential value of each of the low-frequency component and the high-frequency component exceed the predetermined level within the sampling unit time is totalized, and the standard deviation of the totalized value are calculated to judge distribution condition. However, the present invention is not limited to using the standard deviation. For example, it is possible to judge a music genre by using various kinds of statistic such as variance of totalized values, total values, average values.

In the above embodiment, a music genre judging device is configured by combining of the line input terminal 4, the signal processing unit 10 and the control unit 11. However, the music genre judging device is not limited to a device mounted to a game machine. The music genre judging device of the present invention can be applied to various devices for judging the music genre from the music reproduction signal outputted from the music reproduction device to the audio output device such as earphones, headphones, or speakers.

The invention claimed is:

1. A music genre judging device comprising:
    a signal input portion for inputting music reproduction signal outputted from a music reproduction device;
    a signal processing unit for outputting an integration value and a differential value of each of a low-frequency component and a high-frequency component of the music reproduction signal inputted by the signal input portion;
    a data generation unit for inputting each of the integration value and the differential value outputted from the signal processing unit for each of a plurality of predetermined sampling units of time, judging whether the integration value and the differential value exceeds predetermined levels, respectively, within the predetermined sampling unit of time, and generating analysis data obtained by totalizing number of times when each of the integration value and the differential value individually exceeds the predetermined level for each predetermined sampling cycle; and
    a data analysis unit for judging a genre of music outputted form the music reproduction device based on totalized values described in the analysis data.

2. The music genre judging device according to claim 1, wherein the data analysis unit calculates standard deviations of the totalized values respectively to judge the genre of music based on a ratio between the standard deviations.

3. The music genre judging device according to claim 2, further comprising judgment reference data where each ratio of standard deviations is corresponded to each genre of music, wherein the data analysis unit judges a genre corresponded to a ratio closest to the ratio of the calculated standard deviations as a genre of music to be reproduced with the music reproduction signal inputted from the signal input portion.

4. The music genre judging device according to claim 1, further comprising history data where the genre of music and the number of times when the genre is judged by the data analysis unit are corresponded to each other, wherein the data analysis unit updates the history data depending on a judgment result of the genre of music.

5. The music genre judging device according to claim 1, being arranged between a line output terminal of the music reproduction device and an audio output device for audio-converting the music reproduction signal outputted from the line output terminal, wherein the music genre judging device further comprises:
    a bypass route for passing the music reproduction signal outputted form the line output terminal to the audio output device; and
    a route for inputting the music reproduction signal into the signal processing unit.

6. A game machine comprising the music genre judging device according to claim 1 and a game control unit for reflecting a judgment result of the genre of music to game contents.

7. The music genre judging device according to claim 2, further comprising history data where the genre of music and the number of times when the genre is judged by the data analysis unit are corresponded to each other, wherein the data analysis unit updates the history data depending on a judgment result of the genre of music.

8. The music genre judging device according to claim 3, further comprising history data where the genre of music and the number of times when the genre is judged by the data analysis unit are corresponded to each other, wherein the data analysis unit updates the history data depending on a judgment result of the genre of music.

9. The music genre judging device according to claim 2, being arranged between a line output terminal of the music reproduction device and an audio output device for audio-converting the music reproduction signal outputted from the line output terminal, wherein the music genre judging device further comprises:
    a bypass route for passing the music reproduction signal outputted form the line output terminal to the audio output device; and
    a route for inputting the music reproduction signal into the signal processing unit.

10. The music genre judging device according to claim 3, being arranged between a line output terminal of the music reproduction device and an audio output device for audio-converting the music reproduction signal outputted from the line output terminal, wherein the music genre judging device further comprises:
    a bypass route for passing the music reproduction signal outputted form the line output terminal to the audio output device; and
    a route for inputting the music reproduction signal into the signal processing unit.

11. The music genre judging device according to claim 4, being arranged between a line output terminal of the music reproduction device and an audio output device for audio-converting the music reproduction signal outputted from the line output terminal, wherein the music genre judging device further comprises:
- a bypass route for passing the music reproduction signal outputted form the line output terminal to the audio output device; and
- a route for inputting the music reproduction signal into the signal processing unit.

12. The music genre judging device according to claim 7, being arranged between a line output terminal of the music reproduction device and an audio output device for audio-converting the music reproduction signal outputted from the line output terminal, wherein the music genre judging device further comprises:
- a bypass route for passing the music reproduction signal outputted form the line output terminal to the audio output device; and
- a route for inputting the music reproduction signal into the signal processing unit.

13. The music genre judging device according to claim 8, being arranged between a line output terminal of the music reproduction device and an audio output device for audio-converting the music reproduction signal outputted from the line output terminal, wherein the music genre judging device further comprises:
- a bypass route for passing the music reproduction signal outputted form the line output terminal to the audio output device; and
- a route for inputting the music reproduction signal into the signal processing unit.

14. The game machine according to claim 6, wherein the data analysis unit calculates standard deviations of the totalized values respectively to judge the genre of music based on a ratio between the standard deviations.

15. The game machine according to claim 14, wherein the music genre judging device further comprises judgment reference data where each ratio of standard deviations is corresponded to each genre of music, wherein the data analysis unit judges a genre corresponded to a ratio closest to the ratio of the calculated standard deviations as a genre of music to be reproduced with the music reproduction signal inputted from the signal input portion.

16. The game machine according to claim 6, wherein the music genre judging device further comprises history data where the genre of music and the number of times when the genre is judged by the data analysis unit are corresponded to each other, wherein the data analysis unit updates the history data depending on a judgment result of the genre of music.

17. The game machine according to claim 6, wherein the music genre judging device is arranged between a line output terminal of the music reproduction device and an audio output device for audio-converting the music reproduction signal outputted from the line output terminal, wherein the music genre judging device further comprises:
- a bypass route for passing the music reproduction signal outputted form the line output terminal to the audio output device; and
- a route for inputting the music reproduction signal into the signal processing unit.

18. The game machine according to claim 14, wherein the music genre judging device further comprises history data where the genre of music and the number of times when the genre is judged by the data analysis unit are corresponded to each other, wherein the data analysis unit updates the history data depending on a judgment result of the genre of music.

19. The game machine according to claim 15, wherein the music genre judging device further comprises history data where the genre of music and the number of times when the genre is judged by the data analysis unit are corresponded to each other, wherein the data analysis unit updates the history data depending on a judgment result of the genre of music.

* * * * *